(12) United States Patent
Kreitzer

(10) Patent No.: US 7,348,697 B2
(45) Date of Patent: Mar. 25, 2008

(54) SYSTEM FOR VENTILATING A MOTOR

(75) Inventor: Scott Kreitzer, Maineville, OH (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 118 days.

(21) Appl. No.: 11/219,587

(22) Filed: Sep. 2, 2005

(65) Prior Publication Data

US 2006/0076841 A1 Apr. 13, 2006

Related U.S. Application Data

(60) Provisional application No. 60/608,520, filed on Sep. 9, 2004.

(51) Int. Cl.
*H02K 9/00* (2006.01)
*H02K 5/00* (2006.01)

(52) U.S. Cl. ............... 310/59; 310/52; 310/58; 310/89

(58) Field of Classification Search ........... 310/52, 310/58, 89, 258, 59
See application file for complete search history.

(56) References Cited

U.S. PATENT DOCUMENTS

| | | | | |
|---|---|---|---|---|
| 900,977 A * | 10/1908 | Behrend | ...................... | 310/58 |
| 3,461,328 A * | 8/1969 | Drouard | ...................... | 310/52 |
| 4,520,284 A * | 5/1985 | Wolcott | ....................... | 310/42 |
| 4,544,855 A * | 10/1985 | Prenner et al. | ............... | 310/59 |
| 5,698,925 A * | 12/1997 | Coupart | ..................... | 310/217 |
| 5,866,959 A | 2/1999 | Le Flem | ....................... | 310/51 |
| 6,265,795 B1 * | 7/2001 | Semba et al. | .................. | 310/52 |
| 6,750,573 B1 * | 6/2004 | Schmidt et al. | ............... | 310/59 |

FOREIGN PATENT DOCUMENTS

| | | |
|---|---|---|
| EP | 15587 | 9/1911 |
| EP | 60219939 | 2/1985 |
| EP | 2002058204 | 2/2002 |
| WO | WO 01/17094 | 3/2001 |

OTHER PUBLICATIONS

R.Nailen, "What, again? NEMA rewrites its motor standards", Electrical Apparatus, pp. 24-29, Jan. 2000.*
PCT International Search Report—mailed Dec. 22, 2005.

* cited by examiner

*Primary Examiner*—Burton Mullins

(57) ABSTRACT

Certain exemplary embodiments comprise a system comprising: a motor stator comprising: a motor frame comprising a core shell adapted to surround a stator core comprising: a plurality of panels; a plurality of apertures located in one or more of said panels; and a first plurality of non-destructively removable plates adapted to effect a first direction of stator core air flow by impeding airflow through a first selectable sub-plurality of said plurality of apertures.

20 Claims, 8 Drawing Sheets

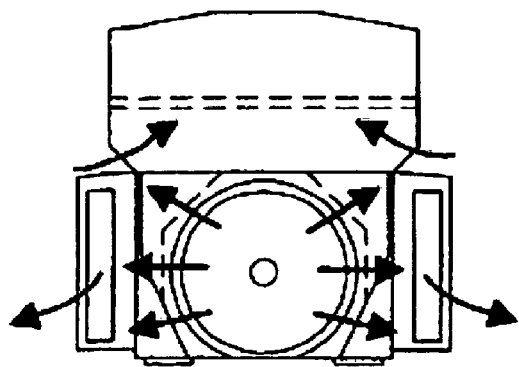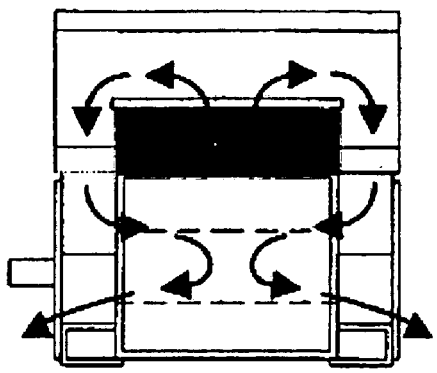
Fig. 5        Fig. 6
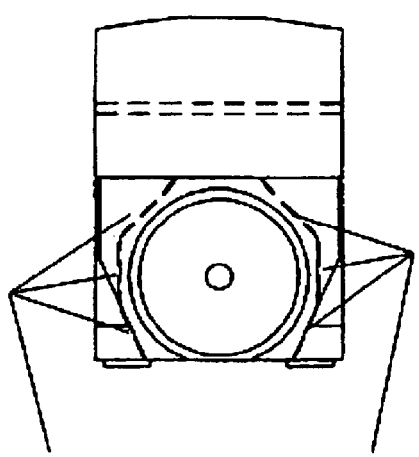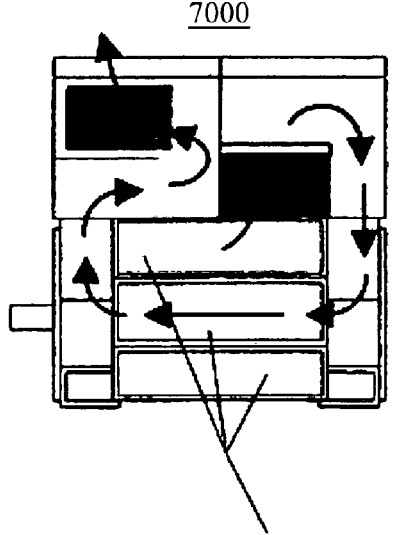
7100        7100
Fig. 7        Fig. 8

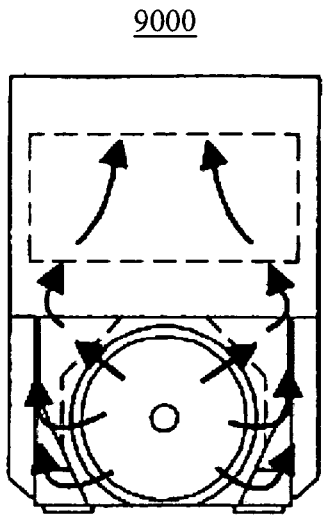
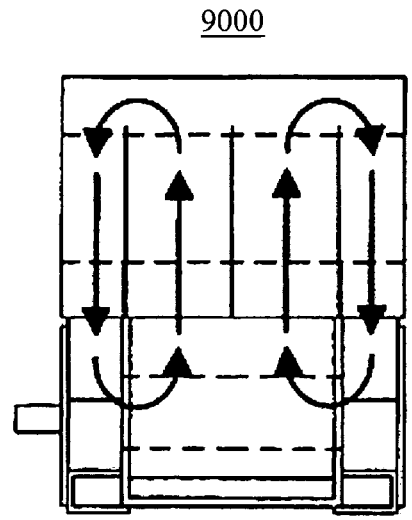
Fig. 9    Fig. 10
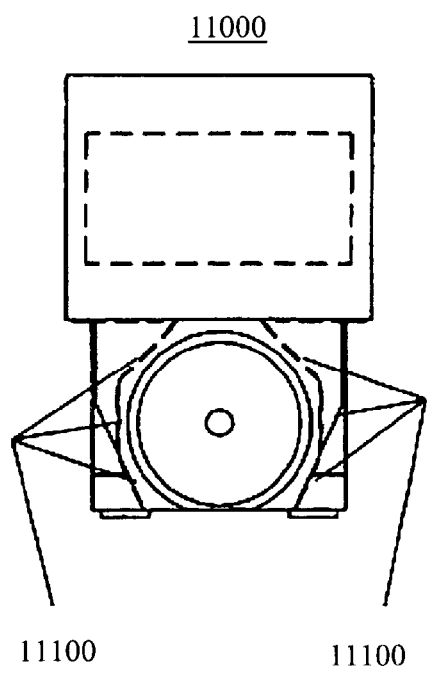
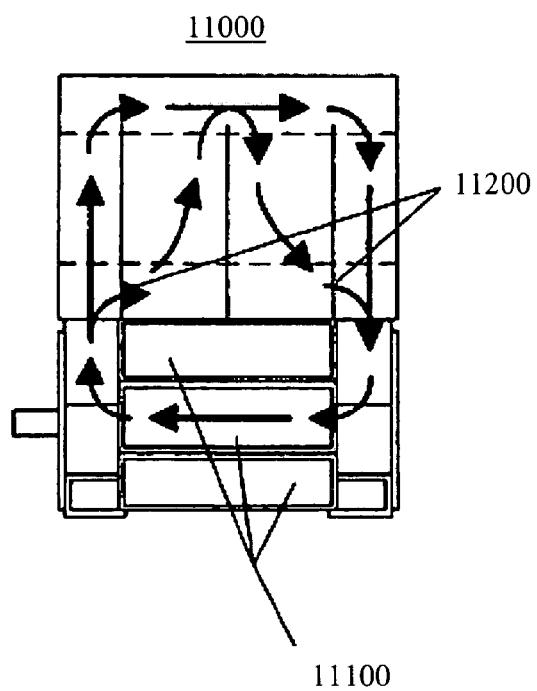
Fig. 11    Fig. 12

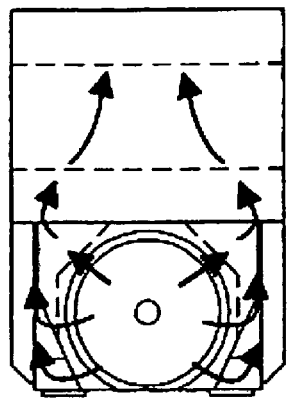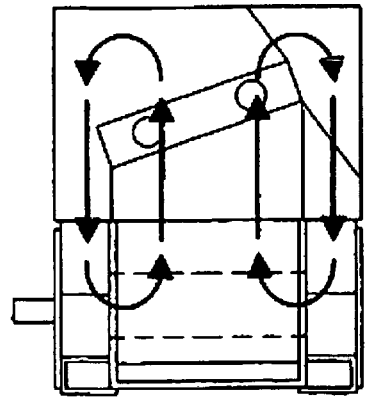
Fig. 13    Fig. 14
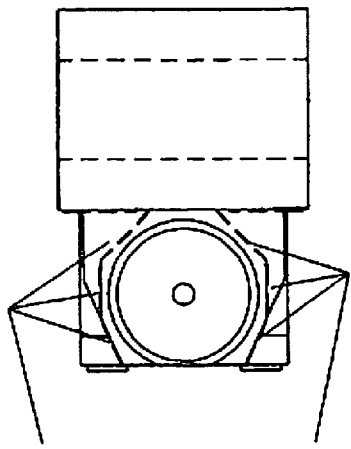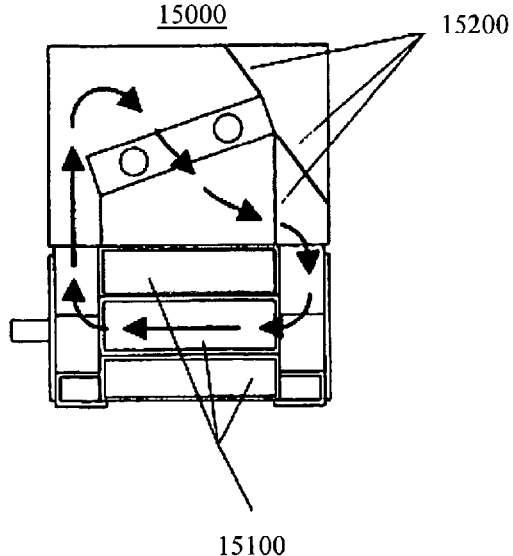
Fig. 15    Fig. 16

SYSTEM FOR VENTILATING A MOTOR

CROSS-REFERENCES TO RELATED APPLICATIONS

This application claims priority to, and incorporates by reference herein in its entirety, pending U.S. Provisional Patent Application Ser. No. 60/608,520, filed 9 Sep. 2004.

BACKGROUND

Various air ventilation methods can be used to cool electric motors. One ventilation scheme, double-end-to-center or "X" ventilation, can bring inlet air from both ends of the motor and can exhaust air out of the center portion of the motor. The air is usually driven by two fans, one on each end of the motor, and by radial vents in the core itself. Another ventilation scheme, end-to-end or "Z" ventilation, can bring inlet air through one end of the motor and can exhaust air out of the opposite end of the motor. The air is usually driven by one large fan on the air outlet side of the motor, and by radial vents in the core itself. The air exiting the stator core can be collected along the back of the core and then can travels axially towards the air exhaust. Additionally, WPII (weather protected II) motors in the US market can have inlet and exhaust enclosures that meet special NEMA MG1 requirements.

Certain ventilation schemes can be more effective at particular motor speeds. For example, X ventilation usually provides better cooling than Z ventilation at higher speeds, and Z ventilation is usually more superior for cooling at lower speeds.

Because of the geometric differences between both ventilation types, one scheme is typically selected for a particular motor product line and manufactured and specified for use for all speeds, resulting in motors with optimized cooling at certain speeds only. As a result, different motor product lines can comprise different ventilation systems, which can be costly and inefficient.

SUMMARY

Certain exemplary embodiments comprise a motor that can be easily and/or selectably reconfigured via the inclusion and/or removal of removable plates to enable an X, Z, and/or another predetermined type of ventilation while otherwise utilizing the same and/or substantially the same mechanical components for the motor. In certain exemplary embodiments, this design can meet the requirements of WPII protection as defined in NEMA MG1, and/or the requirements for Totally Enclosed Air-to Air Cooled (TEAAC) or Totally Enclosed Water-to-Air Cooled (TEWAC).

BRIEF DESCRIPTION OF THE DRAWINGS

A wide variety of potential embodiments will be more readily understood through the following detailed description of certain exemplary embodiments, with reference to the accompanying exemplary drawings in which:

FIG. 5 is an end view of an exemplary internal air flow through a system 5000;

FIG. 6 is a side view of an exemplary internal air flow through a system 5000;

FIG. 7 is an end view of an exemplary internal air flow through a system 7000;

FIG. 8 is a side view of an exemplary internal air flow through a system 7000;

FIG. 9 is an end view of an exemplary internal air flow through a system 9000;

FIG. 10 is a side view of an exemplary internal air flow through a system 9000;

FIG. 11 is an end view of an exemplary internal air flow through a system 11000;

FIG. 12 is a side view of an exemplary internal air flow through a system 11000;

FIG. 13 is an end view of an exemplary internal air flow through a system 13000;

FIG. 14 is a side view of an exemplary internal air flow through a system 13000;

FIG. 15 is an end view of an exemplary internal air flow through a system 15000;

FIG. 16 is a side view of an exemplary internal air flow through a system 15000;

DEFINITIONS

Figure 1:
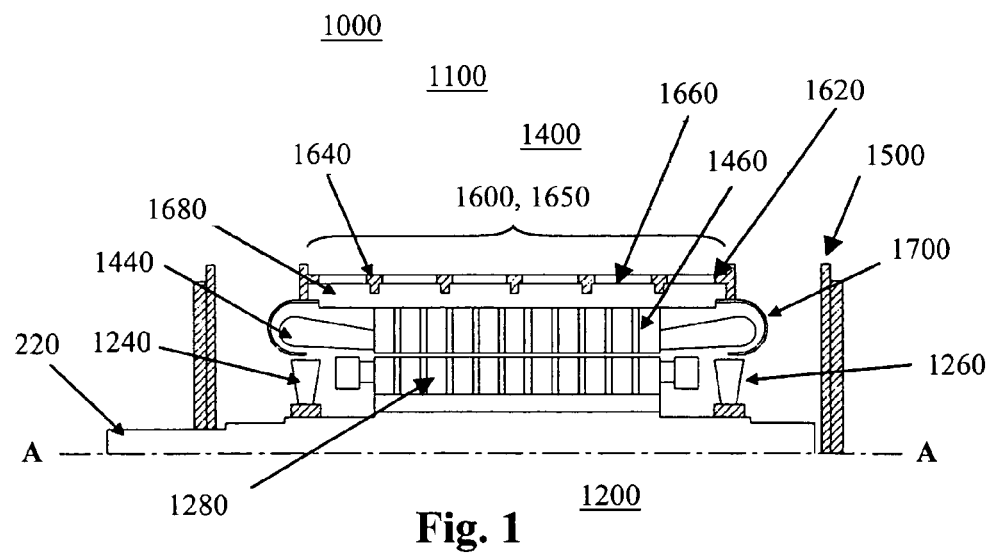
FIG. 1 is a cut-away view of an exemplary embodiment of a system 1000.

When the following terms are used substantively herein, the accompanying definitions apply:

a—at least one.

activity—an action, act, step, and/or process or portion thereof.

adapted to—made suitable or fit for a specific use or situation.

adjacent—close to, near, next to, and/or adjoining.

adjust—to change so as to match, fit, adapt, conform, and/or be in a more effective state.

air flow—a current of air.

and/or—either in conjunction with or in alternative to.

aperture—an opening, hole, gap, and/or slit.

apparatus—an appliance or device for a particular purpose.

automatically—acting or operating in a manner essentially independent of external influence or control. For example, an automatic light switch can turn on upon "seeing" a person in its view, without the person manually operating the light switch.

axis—a straight line about which a body or geometric object rotates or can be conceived to rotate and/or a center line to which parts of a structure or body can be referred.

baffle—a usually static, but potentially movable, device that regulates the flow of a fluid.

can—is capable of, in at least some embodiments.

circulate—to move in or flow through a circuit and/or to move about.

circulation—the movement and/or passage through a circuit, path, and/or system of conduits.

component—a constituent element and/or part.

comprising—including but not limited to.

configuration—an arrangement of parts and/or elements.

continuously—in a manner uninterrupted in time, sequence, substance, and/or extent.

cool—to make less warm, to remove heat from, and/or to reduce the molecular and/or kinetic energy of.

core shell—a structure surrounding the stator core.

couple—to join, link, and/or connect.

cover—to overlay, place upon and/or over, and/or immerse.

cylindrical—of, relating to, and/or having the shape of a cylinder, especially of a circular cylinder.

define—to establish the outline, form, and/or structure of.

device—a machine, manufacture, and/or collection thereof.

direction—the spatial relation between something and the course along which it points or moves.

effect—to bring into existence, to bring about, and/or to produce as a result.

electric motor—a device that converts electrical energy into mechanical energy to turn a shaft.

end—an extremity of something that has length.

fan—a device for creating a flow of a vapor via the rotational movement of typically thin, rigid vanes.

frame—a supporting structure for the stator parts of an AC motor.

heat exchanger—a device used to transfer heat from a first fluid on one side of a barrier to a second fluid on the other side without bringing the first fluid and the second fluid into direct contact with each other.

locate—to place at a certain location.

longitudinal—of and/or relating to a length; placed and/or running lengthwise.

may—is allowed and/or permitted to, in at least some embodiments.

method—a process, procedure, and/or collection of related activities for accomplishing something.

mount—to couple and/or attach to.

National Electrical Manufacturers Association (NEMA)—a non-profit standard-setting organization organized and supported by manufacturers of electric equipment and supplies.

non-destructively removable—able to be removed without destroying and/or degrading a structural integrity of the item removed and/or the item from which it is removed.

open machine—a machine having ventilating openings which permit passage of external cooling over and around the windings of the machine.

operate—to perform a function and/or to work.

operative embodiment—an implementation that is in operation and/or is working as designed.

opposing—placed so as to be opposite something else.

panel—a flat, usually rectangular piece.

plate—a substantially smooth, substantially flat, substantially uniformly thick, relatively thin, and/or substantially rigid body.

plurality—the state of being plural and/or more than one.

portion—a part of whole.

predetermined—established in advance.

provide—to furnish, supply, and/or make available.

qualify—to characterize and/or make eligible.

regular polygon—a plane polygon that is both equilateral and equiangular.

relocate—to move to or establish in a new place remove—to move from a place and/or position occupied.

repeatedly—again and again; repetitively.

rib—a long, narrow, member that, in certain embodiments, projects from the surface of a structure.

rotor—the rotating member and/or armature of motor, which is typically made up of stacked laminations.

set—a related plurality.

shaft—a long, generally cylindrical bar that rotates and transmits power.

stator—a portion of an AC induction motor that does not rotate.

stator core—the iron portion of the stator made up of laminated electric steel. The stator core and the rotor are concentric and separated by an air gap, with the rotor being the smaller of the two and located inside the stator core.

substantially—to a great extent or degree.

surround—to extend on all sides of simultaneously, encircle, enclose, and/or confine on all sides.

system—a collection of mechanisms, devices, data, and/or instructions, the collection designed to perform one or more specific functions.

through—in one side and out the opposite or another side of, across, among, and/or between.

Totally Enclosed—characterized by a motor enclosure that prevents free exchange of air between the inside and the outside of the enclosure but is not airtight. Different methods of cooling can be used with this enclosure.

Totally Enclosed Air-to-Air Cooled—a totally enclosed machine cooled by circulating internal air through a heat exchanger that in turn, is cooled by ambient external air. Provided with an air-to-air heat exchanger for cooling ventilating air and fan or fans integral with rotor shaft or separate, for circulating external air.

Totally Enclosed Water-to-Air Cooled—a totally enclosed machine cooled by circulating internal air through a heat exchanger which in turn, is cooled by an external water supply. Provided with an air-to-water heat exchanger for cooling ventilating air and fan or fans integral with rotor shaft.

via—by way of and/or utilizing.

weather protected Type I—an open machine with its ventilating passages so constructed as to minimize the entrance of rain, snow, and airborne particles to the electric parts, and having ventilating openings constructed to prevent direct access to live metal or rotating parts. The openings are small enough to prevent the passage of a probe as defined by NEMA MG 1.

weather protected Type II—an open, weather-protected machine having its ventilating passages at both intake and discharge so arranged that high velocity air and airborne particles blown into the machine by storms or high winds can be discharged without entering the internal ventilating passages leading directly to the electric parts of the machine itself. The normal path of the ventilating air that enters the electric parts of the machines is arranged by baffling or through a separate housing to provide at least three abrupt changes in direction, none of which are less than 90 degrees. In addition, an area of low velocity not exceeding 600 feet per minute is provided in the intake air path to minimize the possibility of moisture or dirt being carried into the electric parts of the machine.

DETAILED DESCRIPTION

Certain exemplary embodiments comprise a system comprising: a motor stator comprising: a motor frame comprising a core shell adapted to surround a stator core comprising: a plurality of panels; a plurality of apertures located in one or more of said panels; and a first plurality of non-destructively removable plates adapted to effect a first direction of stator core air flow by impeding airflow through a first selectable sub-plurality of said plurality of apertures.

FIG. 1 is a cut-away view of an exemplary embodiment of a system 1000, which can comprise a plurality of components. System 1000 can comprise an electric motor 1100, which can be, can be configured to qualify as, and/or can comprise one or more components configured to qualify motor 1100 as, a National Electrical Manufacturers Association (NEMA) weather protected motor, a weather protected Type II motor, a Totally Enclosed Air-to-Air Cooled (TEAAC) motor, and/or a Totally Enclosed Water-to-Air Cooled (TEWAC) motor, etc.

Motor 1100 can comprise a rotor 1200 and a stator 1400. Rotor 1200 can comprise a motor shaft 1220, fans 1240, 1260, and/or rotor core 1280. Stator 1400 can comprise a motor frame 1500, which can comprise a core shell 1600, which can be adapted to at least partially surround a stator core 1440. Rotor 1200, stator 1400, motor shaft 1220, rotor core 1280, and/or stator core 1440 can define a longitudinal axis A-A of motor 1100.

Core shell 1600 can comprise a plurality of axial ribs 1620 and/or a plurality of circumferential ribs 1640, which can support and/or border a plurality of longitudinal panels 1650, and/or define and/or border a plurality of apertures 1660 defined and/or located in one or more of panels 1650. Core shell 1600 can be comprised of 4, 5, 6, 7 8, 9, 10 or more longitudinal panels 1650, which can be arranged to form a regular polygon when viewed from an axial end of motor 1100, and/or each of which can have a substantially similar longitudinal dimension.

Fan 1240 and/or fan 1260, which can be coupled and/or mounted to rotor 1200 and/or motor shaft 1220, can be adapted to continuously force and/or induce air to circulate and/or flow through, along, near, and/or around stator core 1440, between stator radial vents 1460, within core shell passage 1680, and/or through apertures 1660. Stator core air flow can be deflected and/or effected by one or more air baffles 1700, which can be coupled to core shell 1600. The configuration shown in FIG. 1 can be considered an X ventilation scheme for a motor.

Figure 2:
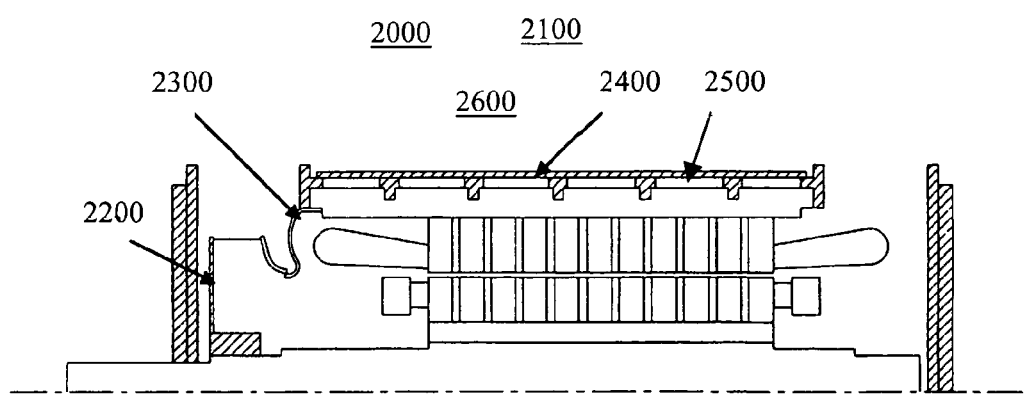
FIG. 2 is a cut-away view of an exemplary embodiment of a system 2000.

FIG. 2 is a cut-away view of an exemplary embodiment of a system 2000, which comprise a motor 2100 that is similar in some respects to motor 1100 of FIG. 1. Motor 2100 can differ in that it can utilize a single fan 2200, a somewhat differently oriented air baffle(s) 2300, and/or one or more non-destructively removable plates 2400 that can attachably, snuggly, snapably, and/or non-destructively removably fit within corresponding apertures 2500 of core shell 2600 and/or can effect a direction of stator core air flow by covering and/or uncovering a selected set and/or sub-set of apertures 2500. Thus, stator core air flow can be effected by baffle 2300 and/or one or more of plates 2400, such as to change an overall and/or localized pattern, velocity, flow-rate, direction, etc. of the stator air flow. For example, by removing certain predetermined plates 2400 from their corresponding apertures 2500, stator core air flow can be effected to flow across a heat exchanger (shown in FIGS. 17 and 19). The configuration shown in FIG. 2 can be considered a Z ventilation scheme for a motor.

Figure 3:
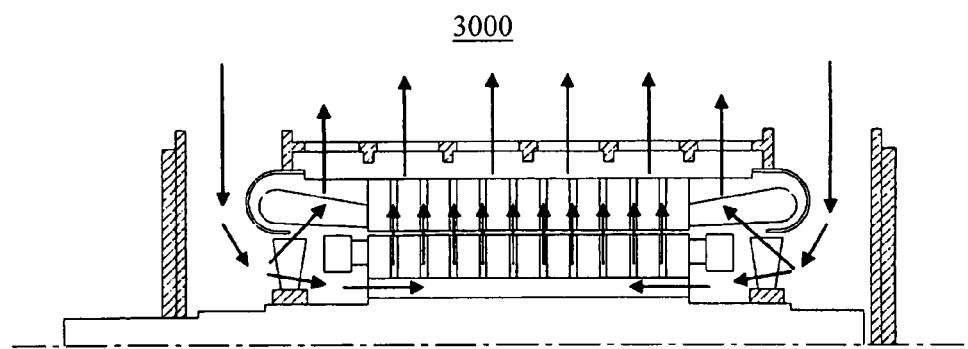
FIG. 3 is a schematic of an exemplary internal air flow through a system 3000.

FIG. 3 is a schematic of an exemplary internal air flow through a system 3000, which is configured as an X ventilation scheme, whereby cooling and/or ventilating air enters the motor from both of its longitudinal ends, flows along and through the rotor and/or stator, and substantially exits via one or more apertures in the motor's core shell.

Figure 4:
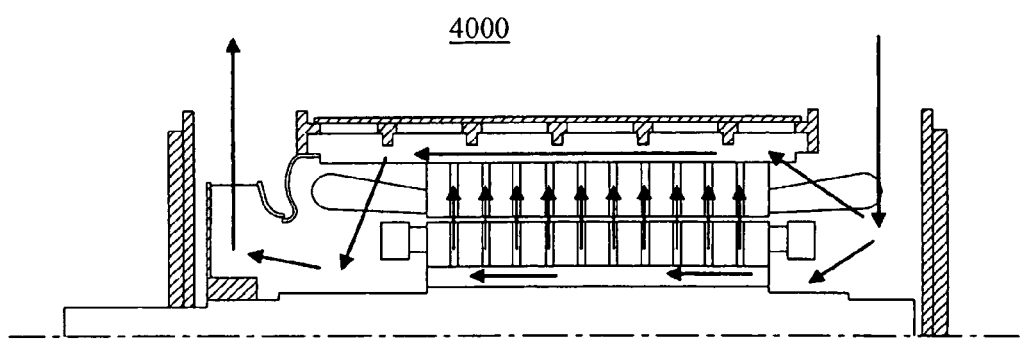
FIG. 4 is a schematic of an exemplary internal air flow through a system 4000.

FIG. 4 is a schematic of an exemplary internal air flow through a system 4000, which is configured as a Z ventilation scheme, whereby cooling and/or ventilating air enters the motor from one of its longitudinal ends, flows along and through the rotor and/or stator, and substantially exits via an opposite longitudinal end. Note that in the Z ventilation scheme, some and/or all of the apertures in the motor's core shell are closed by the non-destructively removable plates.

FIG. 5 is an end view, and FIG. 6 is a side view, of an exemplary internal air flow through a system 5000, which can comprise a Weather Protected II (WPII) style motor configured in the X (i.e., "double end to center") ventilation scheme. FIG. 7 is an end view, and FIG. 8 is a side view, of an exemplary internal air flow through a system 7000, which can comprise a WPII style motor configured in the Z (i.e., "end to end") ventilation scheme. Note that in the Z ventilation scheme, removable plates 7100 can cover the apertures in the core shell, while in the X ventilation scheme, these plates can be removed from the apertures.

FIG. 9 is an end view, and FIG. 10 is a side view, of an exemplary internal air flow through a system 9000, which can comprise a Totally Enclosed Air-to-Air Cooled (TEACC) style motor configured in the X (i.e., "double end to center") ventilation scheme. FIG. 11 is an end view, and FIG. 12 is a side view, of an exemplary internal air flow through a system 11000, which can comprise a TEACC style motor configured in the Z (i.e., "end to end") ventilation scheme. Note that the same TEAAC enclosure can be used for both the X and the Z ventilation scheme by utilizing removable plates 11100. Note also that air flow within the TEACC enclosure can be effected by the positioning of enclosure panels 11200.

FIG. 13 is an end view, and FIG. 14 is a side view, of an exemplary internal air flow through a system 13000, which can comprise a Totally Enclosed Water-to-Air Cooled (TEWAC) style motor configured in the X (i.e., "double end to center") ventilation scheme. FIG. 15 is an end view, and FIG. 16 is a side view, of an exemplary internal air flow through a system 15000, which can comprise a TEWAC style motor configured in the Z (i.e., "end to end") ventilation scheme. Note that the same TEAAC enclosure can be used for both the X and Z ventilation scheme by utilizing removable panels 15100. Note also that air flow within the TEWAC enclosure can be effected by the positioning of enclosure panels 15200.

Figure 17:
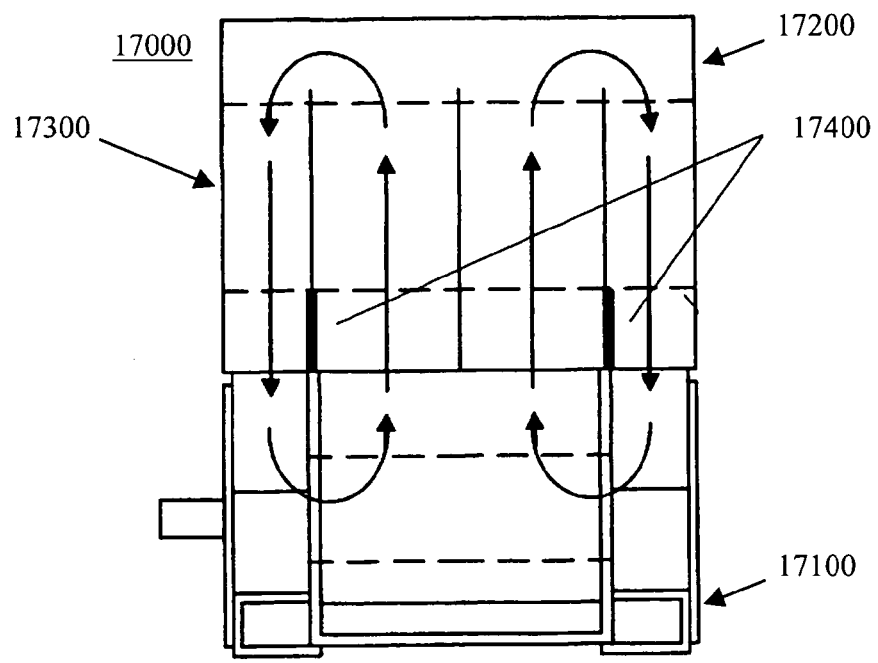
FIG. 17 is a side view of an exemplary internal air flow through a system 17000.
Figure 18:
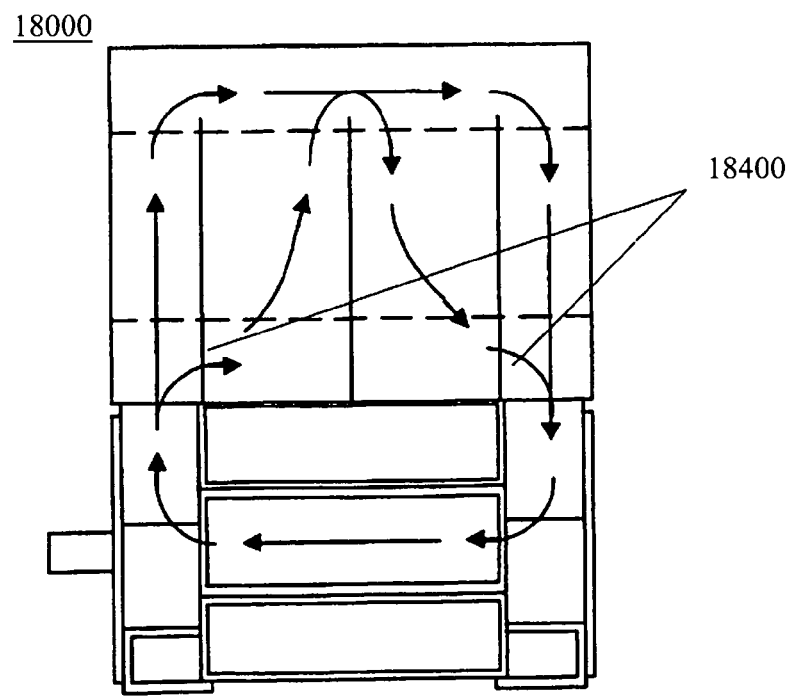
FIG. 18 is a side view of an exemplary internal air flow through a system 18000.

FIG. 17 is a side view of an exemplary internal air flow through a system 17000, that is configured for X ventilation, and which can comprise a motor 17100 coupled to a TEAAC-style enclosure 17200 that surrounds a heat exchanger 17300 adapted to cool air circulated supplied thereto, such as air circulated along the stator core. Enclosure panels 17400 can be attached as shown to prevent air from by-passing heat exchanger 17300. FIG. 18 is a side view of an exemplary internal air flow through a system 18000, which can be substantially similar to system 17000, except that system 18000 is configured for Z ventilation, and/or can have enclosure panels removed to allow air to flow through the heat exchanger.

Figure 19:
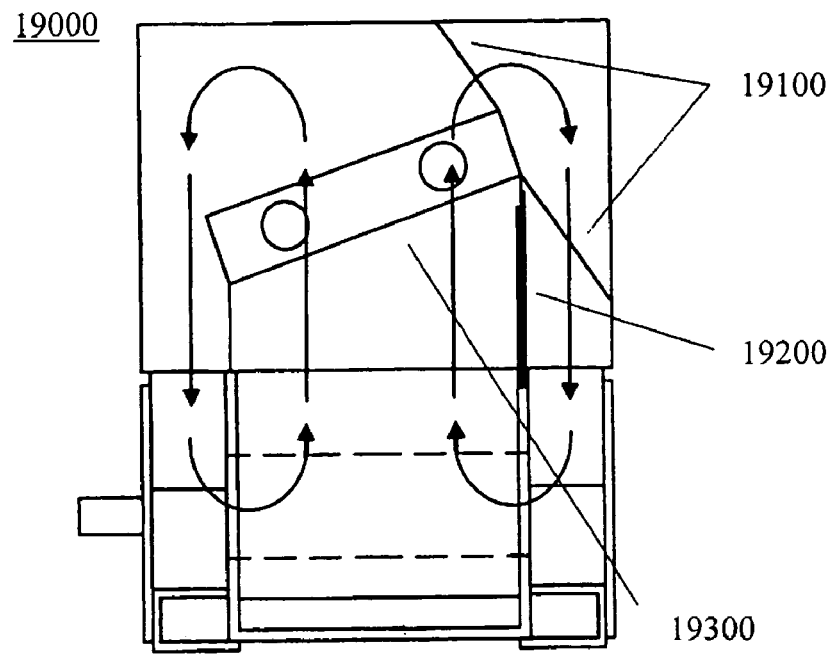
FIG. 19 is a side view of an exemplary internal air flow through a system 19000.
Figure 20:
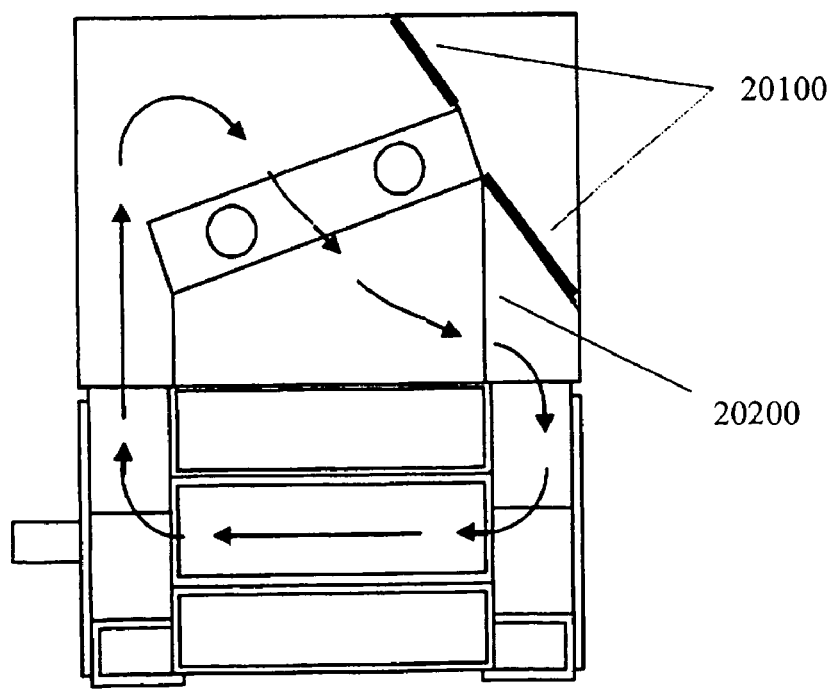
FIG. 20 is a side view of an exemplary internal air flow through a system 20000.

FIG. 19 is a side view of an exemplary internal air flow through a system 19000, that is configured for X ventilation, and which can comprise a TEWAC-style enclosure that surrounds a heat exchanger 19300 adapted to cool air circulated supplied thereto, such as air circulated along the stator core. Enclosure panels 19100 can be removed to allow air to flow through heat exchanger 19300. Enclosure panel 19200 can be attached as shown to prevent air from by-passing heat exchanger 19300. FIG. 20 is a side view of an exemplary internal air flow through a system 20000, which can be substantially similar to system 19000, except that system 20000 is configured for Z ventilation, and/or can have enclosure panels 20100 attached as shown to prevent air from by-passing the heat exchanger, and/or can have enclosure panel 20200 removed to allow air to flow through the heat exchanger.

Figure 21:
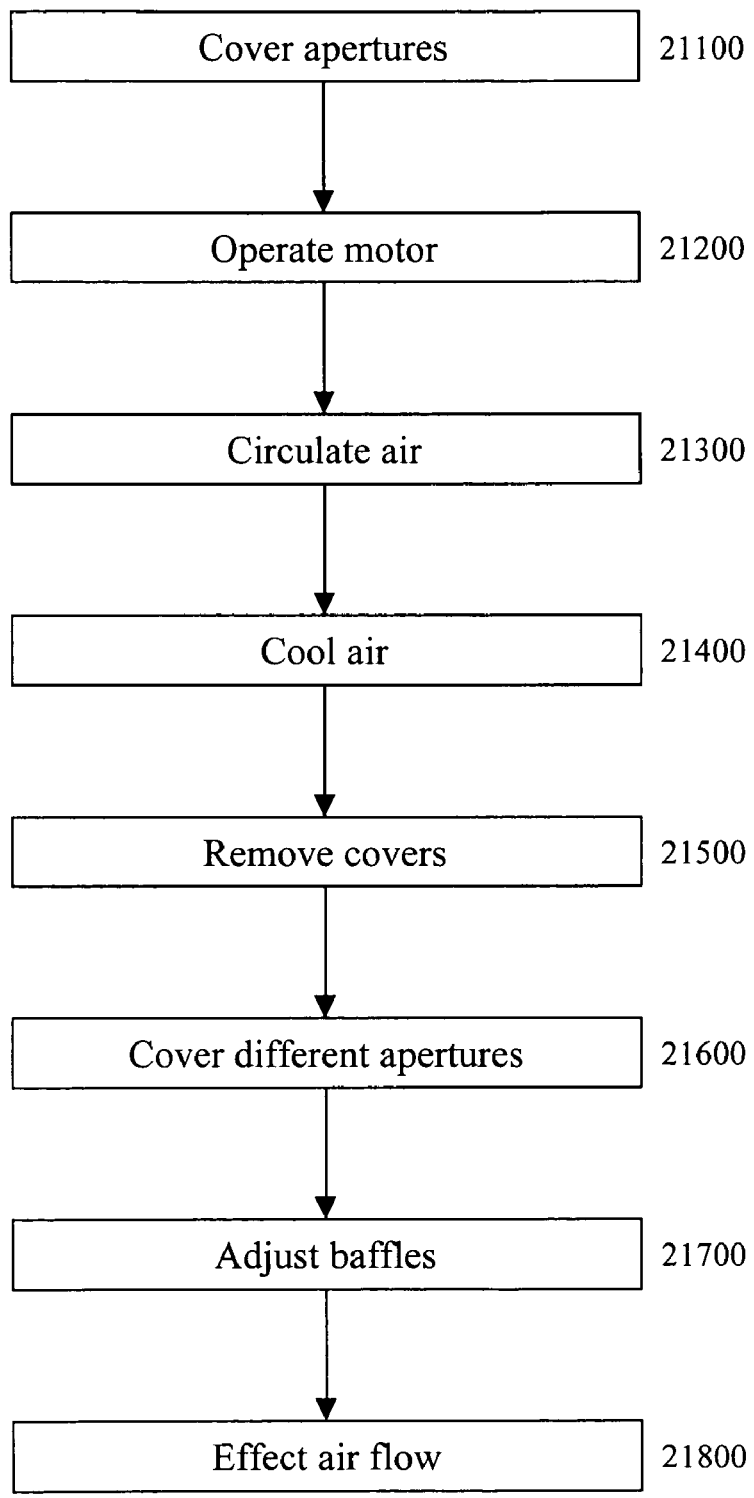
FIG. 21 is a flowchart of an exemplary embodiment of a method 21000.

FIG. 21 is a flowchart of an exemplary embodiment of a method 21000. At activity 21100, one or more apertures in the core shell can be covered. At activity 21200, the motor can be operated. At activity 21300, air can be circulated, such as by virtue of the motor operating and/or its fan rotating. At activity 21400, the circulated air can be cooled, such as via a heat exchanger. At activity 21500, one or more of the covers can be removed. At activity 21600, at least some of the removed covers can be relocated to cover different apertures. At activity 21700, at least some panels and/or baffles can be adjusted. At activity 21800, air flow, the cooling of the motor, and/or the performance of the motor, can be affected by changes to the apertures, covers, panels, and/or baffles. Thus, certain exemplary motors can be easily and/or selectably reconfigured, during manufacturing, after delivery, after installation, and/or after being placed in operation, via the inclusion and/or removal of removable plates to enable an X, Z, and/or another predetermined type of ventilation while otherwise utilizing the same and/or substantially the same mechanical components for the motor.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, such as via an explicit definition, there is no requirement for the inclusion in any claim herein (or of any claim of any application claiming priority hereto) of any particular described or illustrated characteristic, function, activity, or element, any particular sequence of activities, or any particular interrelationship of elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A system for cooling an electric motor, said system comprising a plurality of components comprising:
   a motor stator comprising:
      a motor frame comprising a core shell adapted to surround a substantially cylindrical stator core that defines a longitudinal axis of the electric motor, said core shell comprising:
         at least four longitudinal panels;
         a plurality of apertures located in one or more of said at least four longitudinal panels; and
      a first plurality of non-destructively removable plates adapted to effect a first direction of stator core air flow by covering a first selectable sub-plurality of said plurality of apertures, an operative insertion of said first plurality of non-destructively removable plates into said core shell configured to cause a ventilation of the electric motor to be changed from a ventilation scheme whereby cooling air enters from both longitudinal ends of the electric motor and exits via the plurality of apertures to a ventilation scheme whereby the cooling air enters via a first longitudinal end of the electric motor and exits via a second longitudinal end of the electric motor.

2. The system of claim 1, further comprising:
   a second plurality of non-destructively removable plates adapted to effect a second direction of stator core air flow by covering a second selectable sub-plurality of said plurality of apertures.

3. The system of claim 1, further comprising:
   a fan adapted to continuously circulate air along the stator core.

4. The system of claim 1, further comprising:
   a plurality of fans adapted to continuously circulate air along the stator core.

5. The system of claim 1, further comprising:
   a fan adapted to be coupled to a motor rotor and to continuously circulate air along the stator core.

6. The system of claim 1, further comprising:
   a heat exchanger adapted to cool air circulated along the stator core.

7. The system of claim 1, further comprising:
   an air-to-air heat exchanger adapted to cool air circulated along the stator core.

8. The system of claim 1, further comprising:
   a water-to-air heat exchanger adapted to cool air circulated along the stator core.

9. The system of claim 1, further comprising:
   a baffle coupled to said core shell and adapted to effect stator core air flow.

10. The system of claim 1, further comprising:
    a baffle comprised by the motor and adapted to effect stator core air flow.

11. The system of claim 1, wherein:
    said at least four longitudinal panels form a regular polygon.

12. The system of claim 1, wherein:
    said core shell comprises at least six longitudinal panels.

13. The system of claim 1, wherein:
    said core shell comprises at least eight longitudinal panels.

14. The system of claim 1, wherein:
each of the at least four longitudinal panels has a longitudinal dimension, the plurality of longitudinal dimensions of the at least four longitudinal panels being substantially equal.

15. The system of claim 1, wherein:
each of the first plurality of non-destructively removable plate is adapted to be removed from a corresponding aperture from said first selectable sub-plurality of apertures.

16. The system of claim 1, wherein:
at least one of said first plurality of non-destructively removable plates is adapted to cause air to flow across a heat exchanger.

17. The system of claim 1, wherein:
the motor is a National Electrical Manufacturers Association weather protected Type II motor.

18. The system of claim 1, wherein:
a configuration of said motor stator qualifies the motor as a National Electrical Manufacturers Association weather protected motor.

19. The system of claim 1, wherein:
a configuration of said motor stator qualifies the motor as a Totally Enclosed Air-to-Air Cooled motor.

20. The system of claim 1, wherein:
a configuration of said motor stator qualifies the motor as a Totally Enclosed Water-to-Air Cooled motor.

* * * * *